United States Patent
Kuntz et al.

(10) Patent No.: US 9,475,266 B2
(45) Date of Patent: Oct. 25, 2016

(54) STABILISING THE HONEYCOMB CORE FOR SANDWICH COMPONENTS

(75) Inventors: Julian Kuntz, Augsburg (DE); Juergen Klenner, Bremen (DE); Ralf Trost, Augsburg (DE); Joseph Micheler, Augsburg (DE)

(73) Assignee: PREMIUM AEROTEC GMBH, Augsburg (DE)

( * ) Notice: Subject to any disclaimer, the term of this patent is extended or adjusted under 35 U.S.C. 154(b) by 237 days.

(21) Appl. No.: 14/232,638

(22) PCT Filed: Jul. 10, 2012

(86) PCT No.: PCT/DE2012/000689
§ 371 (c)(1),
(2), (4) Date: Apr. 16, 2014

(87) PCT Pub. No.: WO2013/007235
PCT Pub. Date: Jan. 17, 2013

(65) Prior Publication Data
US 2014/0224408 A1     Aug. 14, 2014

(30) Foreign Application Priority Data
Jul. 14, 2011   (DE) .................. 10 2011 107 725

(51) Int. Cl.
*B32B 37/04*     (2006.01)
*B32B 3/12*      (2006.01)

(52) U.S. Cl.
CPC *B32B 37/04* (2013.01); *B32B 3/12* (2013.01)

(58) Field of Classification Search
USPC ........................................... 428/116
See application file for complete search history.

(56) References Cited

U.S. PATENT DOCUMENTS

| 5,242,651 A * | 9/1993 | Brayden ................. B29C 70/44 156/285 |
| 6,267,838 B1 | 7/2001 | Saugnac et al. |
| 2005/0025929 A1* | 2/2005 | Smith ....................... B32B 3/12 428/73 |
| 2009/0252921 A1* | 10/2009 | Bottler .................. B29C 70/086 428/116 |
| 2011/0151183 A1* | 6/2011 | Reller ....................... B32B 7/12 428/134 |

FOREIGN PATENT DOCUMENTS

| DE | 10037317 A1 | 2/2002 |
| DE | 69615751 T2 | 7/2002 |
| EP | 1897680 A1 | 3/2008 |
| WO | 1577358 A1 * | 9/2005 |
| WO | WO 2010027361 A1 | 3/2010 |

* cited by examiner

*Primary Examiner* — Jeff Aftergut
(74) *Attorney, Agent, or Firm* — Leydig, Voit & Mayer, Ltd.

(57) ABSTRACT

A method for stabilizing a honeycomb core for a sandwich-type structural component includes configuring the honeycomb core. A hardenable adhesive layer is applied to at least one exterior surface of the honeycomb core. A semi-permeable membrane is positioned on the at least one exterior surface. The membrane is gas-permeable and liquid-impermeable. Air in the honeycomb core is drawn off through the semi-permeable membrane. The adhesive layer is hardened.

19 Claims, 6 Drawing Sheets

STABILISING THE HONEYCOMB CORE FOR SANDWICH COMPONENTS

CROSS-REFERENCE TO PRIOR APPLICATIONS

This application is a U.S. National Phase application under 35 U.S.C. §371 of International Application No. PCT/DE2012/000689, filed on Jul. 10, 2012, and claims benefit to German Patent Application No. DE 10 2011 107 725.5, filed on Jul. 14, 2011. The International Application was published in German on Jan. 17, 2013, as WO 2013/007235 under PCT Article 21(2).

FIELD

The present invention relates to a method for stabilising a honeycomb core for a sandwich-type structural component, a device for stabilising a honeycomb core for a sandwich-type structural component and a stabilised core layer for a sandwich-type structural component.

BACKGROUND

Honeycomb structures are used, for example, as the core structure of a sandwich-type lightweight construction component. The honeycomb structures are joined in a laminating process to covering skins or covering layers so that a semi-finished product is available for a lightweight and nevertheless stable component. In the case of correspondingly pre-fabricated honeycomb structures and correspondingly cut covering layers, the finished component may also be produced directly in place of a semi-finished product. However, it has been found that resin from the covering layer material often becomes introduced into the honeycomb openings during the subsequent laminating process, which has a disadvantageous effect on the production process, for example, because the component is rejected in the event of an excessively great accumulation of resin or matrix material inside the honeycomb cavities or insufficient resin in the covering layers.

SUMMARY

In an embodiment, the present invention provides a method for stabilising a honeycomb core for a sandwich-type structural component. The honeycomb core is configured. A hardenable adhesive layer is applied to at least one exterior surface of the honeycomb core. A semi-permeable membrane is positioned on the at least one exterior surface. The membrane is gas-permeable and liquid-impermeable. Air in the honeycomb core is drawn off through the semi-permeable membrane. The adhesive layer is hardened.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
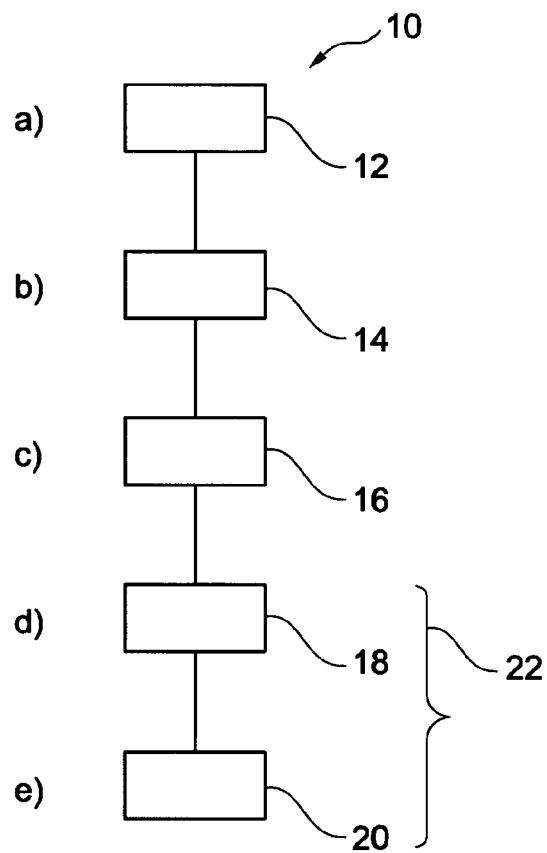
FIG. 1 shows an embodiment of a method for stabilising a honeycomb core for a sandwich-type structural component according to the invention.

In an embodiment, the present invention provides a stabilised honeycomb core, in which the introduction of resin from the region of the covering layers during a subsequent laminating process is minimised.

Embodiments of the present invention include a method for stabilising a honeycomb core for a sandwich-type structural component, a device for stabilising a honeycomb core for a sandwich-type structural component and a stabilised core layer for a sandwich-type structural component.

According to a first embodiment of the invention, there is provided a method for stabilising a honeycomb core for a sandwich-type structural component which has the following steps. In a first step a), a honeycomb core is configured. In a second step b), a hardenable adhesive layer is applied to at least one exterior surface of the honeycomb core. In a third step c), a semi-permeable membrane is positioned on the at least one exterior surface, the membrane being gas-permeable and liquid-impermeable. In a fourth step d), air in the honeycomb core is drawn off through the semi-permeable membrane. In a fifth step e), hardening of the adhesive layer takes place.

The steps d) and e) are, for example, at least partially overlapping, that is to say, they are carried out at least partially at the same time.

The honeycomb core has, for example, a plurality of honeycomb-like openings which are formed by side walls which extend in the direction of the honeycomb core thickness. The honeycomb core has, for example, a planar extent.

The adhesive layer has, for example, at least one layer of adhesive film.

In the second step, the adhesive layer is applied to the end faces of the honeycomb structure. The term "end faces" is intended to denote the faces or cut surfaces of the honeycombs in the thickness direction.

The semi-permeable membrane is gas-permeable and liquid-impermeable from the direction of the adhesive layer outwards. The semi-permeable membrane is air-permeable in particular from the inside outwards and impermeable to the adhesive material contained in the adhesive layer in the liquid state.

According to an embodiment of the invention, there is provided a method in which, after step b) and before step c), a tear-off fabric is applied to the adhesive layer, the membrane being positioned on the tear-off fabric in step c).

According to another embodiment, a draw-off layer is positioned on the semi-permeable membrane after step c).

The draw-off layer may be, for example, a draw-off fleece. The draw-off layer ensures, for example, even under the influence of pressure which is produced, for example, by applying a negative pressure, such adequate dimensional stability that air can be transported or drawn off in the longitudinal direction, that is to say, in the direction of the layer.

According to another embodiment, an air-permeable separating film is arranged between the membrane and the tear-off fabric.

For example, the separating film has a perforation, small openings, for example, distributed uniformly over the surface, openings smaller, for example, than 1 mm.

According to another embodiment of the invention, an air-impermeable cover is arranged on the draw-off layer.

The cover is, for example, a draw-off cover.

The cover may be a vacuum film or an inherently stable vacuum closure.

The air-impermeable cover allows a negative pressure to be applied to one or more locations, the negative pressure applied being distributed more or less uniformly over the surface as a result of the draw-off layer, and therefore also being able to act uniformly on the semi-permeable membrane.

The features or steps described above and those described below may be provided both on only one side of a honeycomb core and also on both sides of the honeycomb core.

The honeycomb core may be provided, for example, on both sides with an adhesive layer, that is to say, the step b) may be provided on both sides of the honeycomb core.

The semi-permeable membrane may be arranged on both sides and measures for drawing off air or a gaseous medium may be provided on both sides.

For example, the tear-off fabric may be provided on both sides of the honeycomb core.

According to one example, a first layer of adhesive film is applied to a first exterior surface of the honeycomb core, the honeycomb core is subsequently rotated and a second layer of adhesive film is applied to the second side (exterior surface) of the honeycomb core.

For example, a first semi-permeable membrane is arranged on the first side.

A first tear-off fabric may be arranged on the first side.

Furthermore, a second semi-permeable membrane may be arranged on the second side. A second tear-off fabric may then also be arranged on the first side.

The different layers can be applied to the honeycomb core and be deposited with the honeycomb core in a tool, the tool being contour-forming for one side of the structural component.

The layers may also be deposited successively in the tool, the sequence naturally being brought about in such a manner that the above-described structural sequence is provided after the layers have been deposited. Subsequently, the layer having the honeycomb core can be inserted, after which additional layers may be inserted, if desired.

According to another embodiment of the invention, the at least one layer of adhesive film is applied continuously and perforated before the hardening operation.

The term "continuous" is understood to be, for example, an adhesive film layer which does not have any openings in the surface.

The term "continuous" may also denote an integral adhesive film layer, that is to say, an adhesive layer in one piece, for example, from a roll.

For the perforation operation, the adhesive film may be pierced, for example, with thin needles.

The perforation is carried out, for example, evenly and distributed over the surface.

According to another embodiment of the invention, the at least one layer of adhesive film is provided with perforations before the application operation and is applied only afterwards or finally.

For example, the adhesive film layer may also be pre-perforated and subsequently be provided with additional perforations in the applied state.

According to another embodiment of the invention, the at least one layer of adhesive film is perforated by a needle roller.

According to another embodiment of the invention, there is provided a method in which air is drawn off through the holes of the perforations before the adhesive layer is hardened. The adhesive layer becomes liquid at first during the hardening operation and the holes close again when the adhesive layer hardens.

The adhesive layer may first become liquid, for example, by heating for the hardening operation and subsequently harden with the further influence of temperature.

Instead of introducing heat for liquefying and hardening, it is also possible for other effective mechanisms to be provided, for example, liquefying as a result of a chemical process. The hardening may also, as an alternative to a chemical reaction with the introduction of heat, be brought about by a chemical process without the introduction of heat. Naturally, the different operations may also be combined, for example, liquefying by a chemical process and hardening by heating, or liquefying by heating and hardening by a chemical process. A thermoplastic material which becomes solid again by cooling without any chemical reaction is provided as another example.

According to another embodiment of the invention, the adhesive layer has at least one adhesive film layer having a carrier structure, the carrier structure having such a sealed structure, which is not, however, completely closed, that the adhesive layer is also held together by the surface tension effects of the adhesive film in the event that the adhesive film liquefies temporarily during the hardening operation in order to minimise the tendency towards the formation of holes in the layer.

Abutment of the adhesive layer with the semi-permeable membrane during the hardening operation may support closing of the perforations of the adhesive layer.

According to another embodiment of the invention, the adhesive layer has at least one adhesive film which is film-like at ambient temperature and is temporarily liquid only after being heated.

The honeycomb core comprises, for example, a composite material. The honeycomb core may comprise phenol resin-impregnated aramide paper, glass-fibre-reinforced paper, chemical-fibre-reinforced paper, or a similar material.

According to another embodiment of the invention, there is provided a method in which the following steps are provided after the hardening in step e): in a first additional step, the tear-off fabric is removed. In a second additional step, a covering layer is arranged on at least one side of the honeycomb core stabilised with the adhesive layer. Subsequently, in a third additional step, the covering layer is joined to the honeycomb core in a laminating operation.

A second adhesive layer may be arranged on the first adhesive layer.

The covering layer may have a fibre-reinforced composite material in which fibres are embedded in a matrix material.

According to another embodiment of the invention, the laminating operation comprises hardening of the matrix material, the matrix material of the covering layer(s) initially becoming liquid during hardening, and the adhesive layer preventing the matrix material from becoming introduced into the honeycomb cores.

Introduction is prevented, for example, to the greatest possible extent or at least partially. In any case, introduction is reduced, for example, completely in many cells.

According to a second aspect of the invention, there is provided a device for stabilising a honeycomb core for a sandwich-type structural component which comprises a receiving device for receiving a workpiece and a vacuum device for producing a negative pressure. A honeycomb core, to which a hardenable adhesive layer is applied on at least one side, is arranged as a workpiece in the receiving device. There is provided a semi-permeable membrane which is gas-permeable and liquid-impermeable. The vacuum device is configured so as to draw off air in the honeycomb core at least partially through the semi-permeable membrane.

Starting from the inside of the honeycomb core, the membrane is arranged on the far side of the adhesive layer.

A tear-off fabric may be provided between the adhesive layer and the membrane.

A draw-off layer may be provided on the semi-permeable membrane.

The vacuum device may have an air-impermeable cover which is arranged on the draw-off layer.

According to a third aspect of the invention, there is provided a stabilised core layer for a sandwich-type structural component which has a honeycomb core having a large number of honeycomb-like cells which are separated from each other by partition walls, the partition walls extending in the direction of the honeycomb core thickness. The stabilised core layer further has at least one adhesive layer applied on the end faces of the partition walls, the adhesive layer having at least one hardened adhesive film layer and closing the honeycomb-like cells on at least one side in such a manner that introduction of resin is reduced in a subsequent laminating operation that uses a resin-impregnated covering layer. The adhesive layer has, for example, openings having a maximum diameter of 0.1 mm, for example, smaller than 0.05 mm.

The stabilised core layer may further be provided with one or two covering layers which are joined to the honeycomb core by means of the adhesive layer and which result in a sandwich-type structural component as a result of the adhesion. The covering layers comprise, for example, a fibre-reinforced composite material in which fibre material is embedded in a matrix material or resin. The introduction of resin or matrix material is prevented to the greatest possible extent, or is reduced as a result of the adhesive layer having very small openings.

The core layer may terminate at the edges in a tapering cross-section, for example, in a ramp-like end piece, so that there is, for example, a sloping transition from the sandwich region to a monolithic region. The ramp-like edge serves, for example, to prevent the honeycombs from becoming laterally pressed together under pressure or under vacuum.

According to another aspect of the invention, a honeycomb structure is closed with an adhesive layer on least at one side, the semi-permeable membrane allowing air to be drawn off, in particular from the region of the honeycomb cavities. It is further possible, by means of the semi-permeable membrane, to prevent a porous adhesive layer from forming by applying a negative pressure as the vacuum/negative pressure draws off any air bubbles present in the adhesive layer. The air in the region of the honeycomb cavities can be drawn off by applying a negative pressure to such an extent that, in the event of subsequent warming which may be necessary for hardening the adhesive layer, there is no occurrence of curving of the adhesive layer in an outward direction which would result in undesirable deformation of the surface structure. If, in contrast, the volume of a honeycomb cavity is completely filled with air owing to the "full" proportion by volume present at normal pressure, curvature occurs in a closed adhesive layer on warming during the hardening operation, which results in the adhesive layer not adjoining the honeycomb structure during the hardening operation and not producing a joint, or producing only a poor joint, which would result in weakening of the subsequent sandwich-type component.

Consequently, the semi-permeable membrane affords the advantage that, on the one hand, it prevents liquid adhesive material from being able to be drawn outwards from the layer of adhesive and, on the other hand, it makes it possible for air to be drawn out of the honeycomb cavities. Since, in the hardening operation, the adhesive layer, for example, when it has been perforated beforehand, initially becomes liquid, for example, as a result of heating, i.e. before it hardens, and thereby a closed adhesive layer is produced, more air can still be drawn off even then because the membrane prevents liquid adhesive layer material from being able to be introduced through the membrane, for example, in the draw-off direction. In any case, the negative pressure in the honeycomb cells results in the force acting as a result of the applied vacuum being sufficient during hardening to ensure that the adhesive layer does not harden so as to be curved in an outward direction but instead adjoins the core all over and produces a good joint. During the hardening, therefore, no additional forces need be applied using additional tools in order to ensure dimensional stability. At this point, reference is also made to subsequent hardening in the context of a laminating operation. In a closed adhesive layer, a given air quantity is enclosed in the honeycomb cavity. Naturally, curvature of the adhesive layer may occur where the level of warming is correspondingly high. However, curvature is counteracted since the workpiece is also kept under additional pressure during the laminating operation, for example, by two corresponding tool halves forming a defined intermediate space or the component being hardened in an autoclave under excess pressure acting from outside.

It should be noted that the features of the embodiments and aspects of the devices also apply to embodiments of the method and use of the device, and vice versa. Furthermore, the features for which this is not explicitly mentioned may also be freely combined with each other.

According to the present invention, in conjunction with honeycomb structures, for example, comprising aramide paper, for use as a core structure of a sandwich-type lightweight construction component, there is provision for those honeycombs to be stabilised and sealed before the laminating process of the covering skins with a hardened adhesive film layer in order to make said honeycombs more operationally stable and to prevent resin from flowing out of the covering layers into the honeycombs. It is advantageously possible to a greater extent to produce an adhesive film layer which is sealed and practically without any holes by means of the process described below, i.e. the different embodiments of the method and the devices also described below, so that the flow of resin can be prevented to a substantially greater extent, which results in better component quality, a more stable production process and a lower reject rate.

In accordance with the present invention, the term "honeycomb core" is also to be understood to refer to other structures in which there are arranged in the direction of the thickness a plurality of partition walls or webs, between which cavities are located. The cavities may be constructed to be continuous or interrupted, that is to say, open only on one side. The cell walls or partition walls extend, for example, perpendicularly to the panel surface or obliquely relative to the panel surface, i.e. at an angle other than 90°. The cavities may also be filled with filling material, for example, for insulation purposes or sound absorption purposes. In particular, the term "honeycomb core" is also to be understood to refer to lattice materials which are stabilised or reinforced by the application of at least one adhesive layer so as to be easier to handle subsequently for producing a sandwich-type component.

According to an aspect of the invention, there is provision for it to be possible for one or more layer(s) of adhesive film to be located on the honeycomb and for a layer of tear-off fabric to be provided thereon. A semi-permeable membrane which is permeable with respect to air but not to liquids is positioned thereon. Another draw-off fleece may then be provided above the membrane, or positioned at that location. The air can thereby be drawn off without adhesive film running off into the draw-off fleece. In a supporting manner, the adhesive film may be perforated with thin needles before the hardening process so that, in the cold state, air can be drawn out of the honeycomb. During hardening, the adhesive film first becomes liquid and the small perforations formed close again under the membrane. Furthermore, an adhesive film having a tight, close-meshed carrier structure may be used.

As a result of the new process structure and the associated devices, the air can be drawn out of the honeycomb through the perforations in the adhesive film and the semi-permeable membrane at the beginning of the process when the adhesive film is still cold or relatively solid. After temporary liquefaction of the adhesive film, for example, by heating, the piercings in the adhesive film close again, a portion of the adhesive substance flows into the tear-off fabric but the membrane stops any further flow of adhesive in an outward direction. After the adhesive film has hardened, an adhesive film layer is produced which adheres well to the honeycomb and which has no holes or, at best, very minimal holes or pinholes. As a result, in a subsequent process, i.e. for example, during lamination of the covering layers of the sandwich-type component, less resin flows into the honeycomb and the covering layers have a more constant fibre volume content and a lower porosity.

At this point, it may be noted that, although the provision of perforations in the adhesive film supports or improves the advantages in accordance with the present invention, the method according to the invention is also possible without these perforations. This also applies to the use of a tear-off fabric which may be advantageous according to the present invention but is not absolutely necessary.

According to the invention, for example, a plurality of adhesive films may be used, for example, having different carrier structures.

According to the invention, a core structure which is coated or closed externally by hardened adhesive film layers which are as impermeable as possible is provided for a sandwich-type component. In a downstream laminating process of the covering layers, the honeycomb is thus more stable with respect to deformations and in particular no resin or at least less resin flows from the covering layers into the core structure, or less air is introduced from the core into the covering layers where it can produce porosity. The adhesive layer, in particular in the case of two-sided construction, further also prevents, for example, the honeycomb core from becoming deformed in a laminating operation under the pressure generally applied in the process.

FIG. 1 shows a method 10 for stabilising a honeycomb core for a sandwich-type structural component, in which the following steps are provided: in a first step 12, a honeycomb core is configured; in a second step 14, a hardenable adhesive layer is applied to at least one exterior surface of the honeycomb core. In a third step 16, a semi-permeable membrane is positioned on the at least one exterior surface, the membrane being gas-permeable and liquid-impermeable. In a fourth step 18, air in the honeycomb core is drawn off through the semi-permeable membrane. In a fifth step 20, the adhesive layer hardens.

The first step 12 is also designated step a), the second step 14 is also designated step b), the third step 16 is also designated step c), the fourth step 18 is also designated step d) and the fifth step 20 is also designated step e).

As indicated in FIG. 1 by a bracket 22, the drawing-off action in the fourth step 18 and the hardening action in the fifth step 20 may be carried out in an at least partially overlapping manner.

Figure 2:
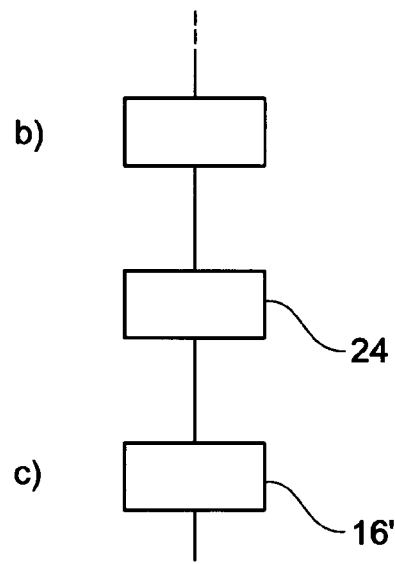
FIGS. 2-9 show additional embodiments of methods according to the invention.

According to the additional embodiment shown in FIG. 2, an additional step 24 in which a tear-off fabric is applied to the adhesive layer is provided after step b) and before step c), with the membrane being positioned on the tear-off fabric in step c), which is indicated in FIG. 2 by the reference numeral 16'.

Figure 3:
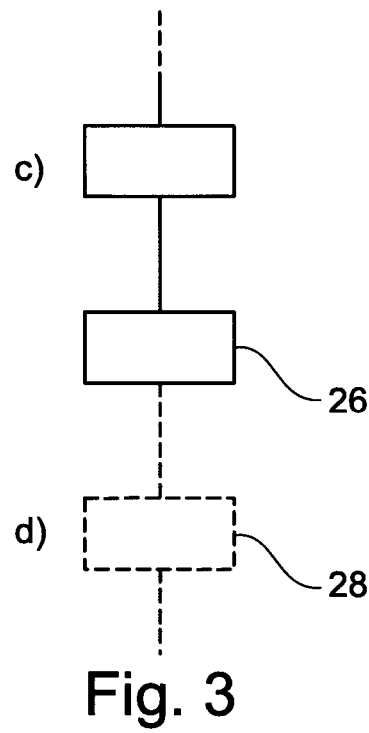

After step c), in a subsequent step 26, as shown in FIG. 3, a draw-off layer may be positioned on the semi-permeable membrane. For example, the draw-off layer may be a draw-off fleece. Subsequently, the steps already illustrated in FIG. 1 can be carried out, as can other construction variants or a combination with other features which are described by way of example in the following figures. This capacity for combination is schematically indicated in FIG. 3 by broken lines 28.

Figure 4:
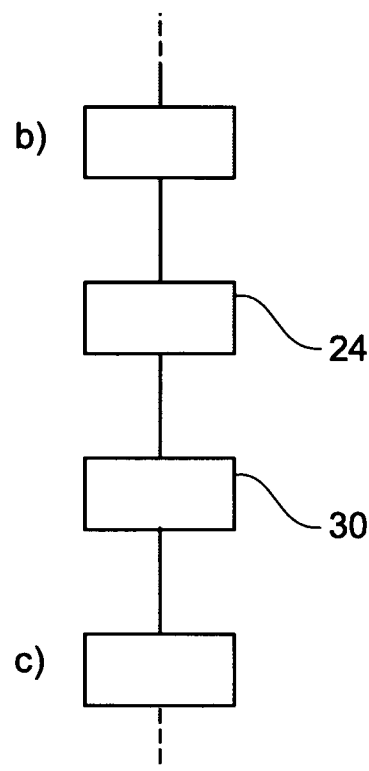

According to the embodiment shown in FIG. 4, in an intermediate step 30 an air-permeable separating film is arranged between the membrane and the tear-off fabric.

Figure 5:
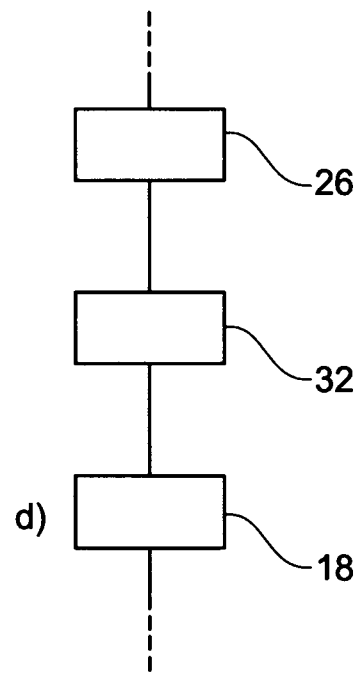

As shown in FIG. 5, in the fourth step 18 an air-impermeable cover may be arranged on the draw-off layer for the drawing-off operation, for which purpose an additional intermediate step 32 is shown between the draw-off layer being positioned in step 26 and the drawing-off action in step 18. The cover is, for example, a draw-off cover or vacuum film. The air-tight film, under which the air between the film and the mould is drawn off, is also referred to as the vacuum bag together with the tool located under the workpiece (the solid mould for contour formation is also referred to as tooling).

As an alternative to a vacuum film, a dimensionally stable draw-off device may also be brought into contact with the semi-permeable membrane, the draw-off device having, for example, a large number of smaller draw-off openings in order to be able to apply a uniform or at least predominantly uniform negative pressure to the semi-permeable membrane in order to draw off air.

The draw-off device may also be combined, for example, with the draw-off layer.

Figure 6:
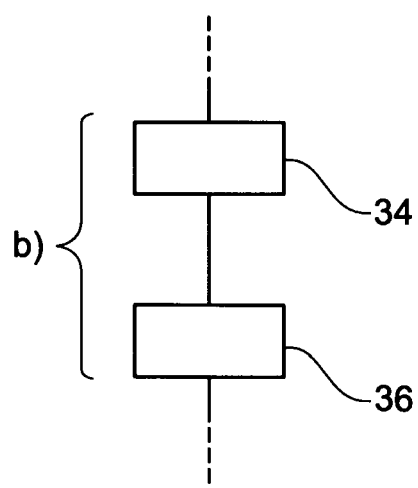

In the second step 14, that is to say, step b), as shown in FIG. 6, the at least one layer of adhesive film can be applied continuously in a first partial step 34 and, in a second partial step 36, can be perforated before the hardening operation. For the perforation, the adhesive film can be pierced, for example, with thin needles.

Figure 7:
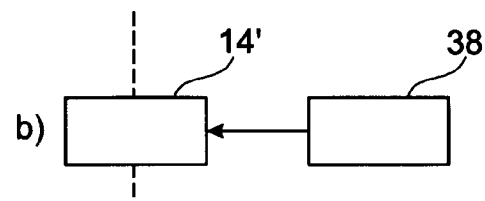

As illustrated in FIG. 7, the at least one layer of adhesive film can, before being applied, be provided with perforations in a perforation step 38 and subsequently be applied in step b), which is indicated by the reference numeral 14'.

For example, the at least one layer of adhesive film can be perforated by a needle roller.

Figure 8:
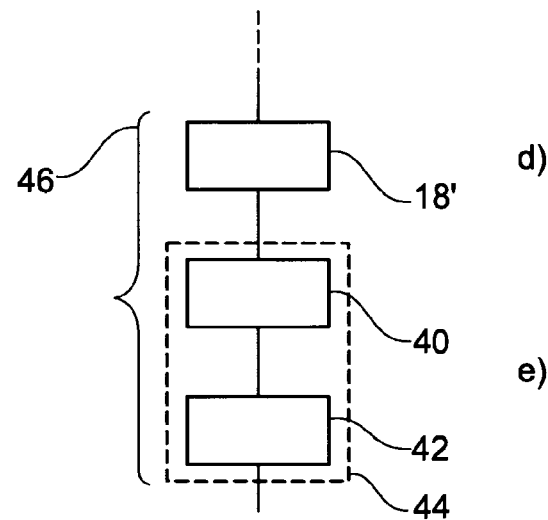

As illustrated in FIG. 8, air can be drawn off in a drawing-off step 18' through the holes of the perforations before hardening of the adhesive layer, the adhesive layer initially becoming liquid during the hardening operation in a first hardening partial step 40 and the holes closing again during hardening of the adhesive layer in a second hardening partial—step 42. FIG. 8 indicates by a dot-dash rectangle 44 which surrounds the two hardening partial steps 40, 42 that the two hardening partial steps are carried out in the context of the hardening step 20, wherein it is also indicated here by a connecting bracket 46 that drawing-off of the air in step 18' or step d) can be carried out at least partially in an overlapping manner with the hardening operation or step e).

Figure 9:
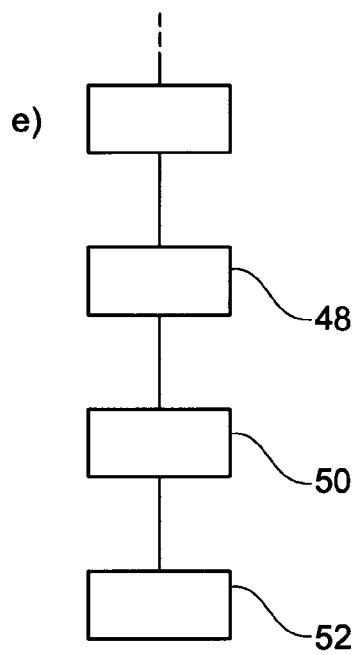

FIG. 9 shows another embodiment of a method according to the invention, in which a first additional step 48, in which the tear-off fabric is removed, is provided after the hardening operation in step e). In a second additional step 50, a covering layer is arranged on at least one side of the honeycomb core stabilised with the adhesive layer. In a third additional step 52, the covering layer is joined to the honeycomb core in a laminating operation.

The covering layer comprises, for example, a fibre-reinforced composite material in which fibres are embedded in a matrix material.

The laminating operation also comprises, for example, hardening of the matrix material, with the matrix material initially becoming liquid during hardening and the adhesive layer preventing the matrix material from being introduced into the honeycomb cores, or preventing this to the greatest possible extent, for example, minimising this, but which is not illustrated in greater detail.

Figure 10:
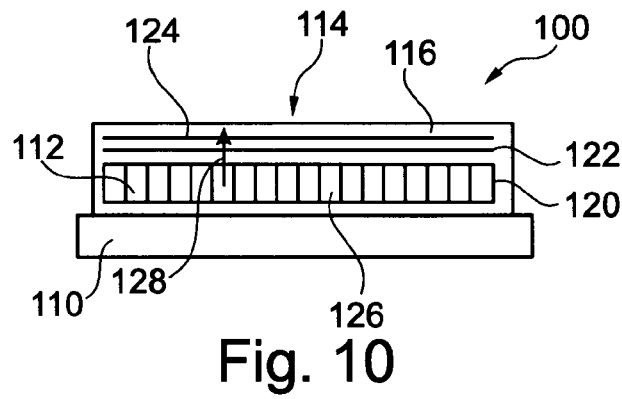
FIG. 10 shows an embodiment of a device for stabilising a honeycomb core for a sandwich-type structural component according to the present invention.

According to the present invention, a device 100 is also provided for stabilising a honeycomb core for a sandwich-type structural component, which device has a receiving device 110 for receiving a workpiece 112. Furthermore, a pressure reduction device 114 for producing a negative pressure 116 is provided. A honeycomb core 120 on which a hardenable adhesive layer 122 is arranged or applied on at least one side is arranged as the workpiece in the receiving device 110. FIG. 10 shows the adhesive layer 122 with spacing from the honeycomb core 120 in order to illustrate that this layer is a separate layer which is applied to the honeycomb core. In other words, the spacing therebetween serves only for greater clarity and does not indicate an actual spacing. According to the invention, there is provided a semi-permeable membrane 124 which is gas-permeable and liquid-impermeable. The vacuum device 114 is configured to draw off air, which is located in the honeycomb core and which is designated 126, at least partially through the semi-permeable membrane which is indicated with an arrow 128.

The semi-permeable membrane 124 is arranged, for example, on the adhesive layer 122. However, additional layers may also be provided between the adhesive layer 122 and the membrane 124, such as, for example, a layer having a tear-off fabric. In particular, the layers which are described above in conjunction with the construction variants of the method may be provided.

Figure 11A:
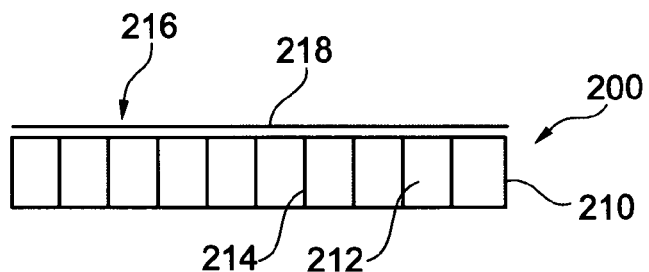
FIGS. 11*a*-11*b* show an embodiment of a stabilised core layer for a sandwich-type structural component according to the present invention.
Figure 11B:
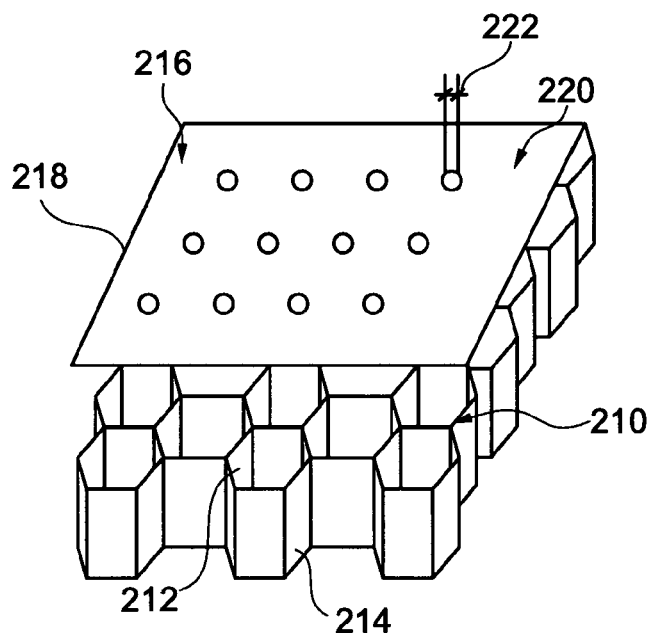

As schematically indicated in FIGS. 11a and 11b, a stabilised core layer 200 is also provided in accordance with the present invention. The stabilised core layer 200 for a sandwich-type structural component has a honeycomb core 210 with a plurality of honeycomb-like cells 212 which are separated from each other by partition walls 214, the partition walls extending in the direction of the honeycomb core thickness. FIG. 11a is a cross-section through the stabilised core layer 200 and FIG. 11b is a perspective plan view of the structure, the honeycomb core 210 being illustrated alone in the front region for greater clarity.

According to the invention, at least one adhesive layer 216 applied to the end faces of the partition walls is/are provided, the adhesive layer having at least one hardened adhesive film layer 218. FIG. 11a illustrates the adhesive film layer 218 with spacing from the honeycomb core 210 situated beneath it for reasons of greater clarity. It should be noted that the adhesive film layer 218 is applied directly to the end faces of the partition walls, i.e. without any spacing. The adhesive film layer 218 closes the honeycomb-like cells 212 on at least one side in such a manner that introduction of resin is reduced in a subsequent laminating operation with a resin-impregnated covering layer. To that end, the adhesive layer has openings 220 which have a maximum diameter 222 of 0.1 mm.

The core layer is formed in the Figure so as to have a straight edge which extends transversely or perpendicularly to the surface in section.

According to another example, a tapering cross-section with which the honeycomb core terminates, in a manner of speaking, for example, with a ramp-like end piece, may be provided at the edges. As a result, for example, a sloping transition can be achieved from the sandwich region to a monolithic region. The tapering, for example, ramp-like, edge can prevent the honeycombs from being pushed together laterally under pressure or vacuum.

In another embodiment, there is also provided on the other side (exterior surface) of the honeycomb core an adhesive layer 216 which also closes the honeycomb-like cells at that location, as described above.

Figure 12:
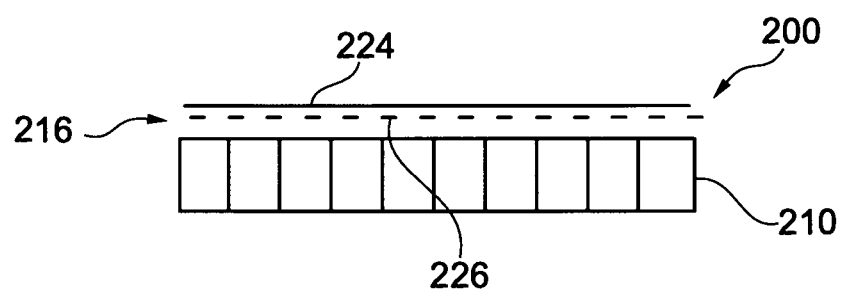
FIGS. 12-14 shows additional embodiments of stabilised core layers according to the invention.

FIG. 12 shows another embodiment of the stabilised core layer 200. The adhesive layer 216 has at least one adhesive film layer 224 having a carrier structure 226. The carrier structure has such a sealed structure, which is not, however, completely closed, that the adhesive layer is held together by the surface tension effects of the adhesive film even when the adhesive film liquefies temporarily during the hardening operation, in order to minimise the tendency towards the formation of holes in the layer.

It should be noted that the arrangement of the carrier structure 226 in the direction of the honeycomb core 210 is a first embodiment. In another embodiment, the arrangement is precisely reversed, i.e. the adhesive film layer 224 is arranged in the direction of the honeycomb core 210, and the carrier structure 226 is thereabove with reference to FIG. 12.

According to another example, the adhesive film having the carrier layer is supplied as a composite material. The carrier material allows better handling of the adhesive film in order to prevent tearing or deformation.

For example, two adhesive film layers may be used one layer, for example, having a coarser, more open carrier structure and a great deal of adhesive and one layer having a finer, more sealed carrier structure but less resin.

Figure 13:
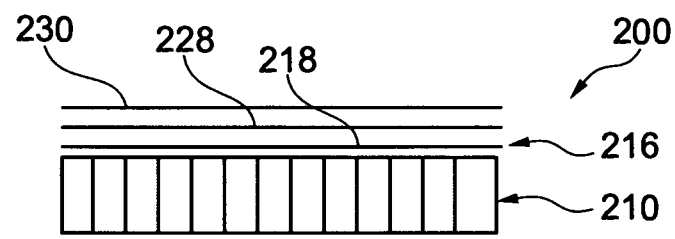

FIG. 13 shows another embodiment of the stabilised core layer 200, in which a tear-off fabric 228 is arranged on the adhesive layer 218. A membrane 230 is arranged on the tear-off fabric 228, the membrane 230 having semi-permeability and being gas-permeable and liquid-impermeable, as described above in conjunction with the various embodiments of a method according to the invention. In the embodiment of the stabilised core layer 200 shown in FIG. 13, the individual layers are shown with spacing from each other, as also mentioned in conjunction with the other Figures, in order to ensure greater clarity of the Figure. In reality, the individual layers adjoin each other or adhere to each other.

The embodiment shown in FIG. 13 is an intermediate product in which the semi-permeable membrane 230 is still joined to the stabilised core layer, that is to say, the honeycomb core 210 and the adhesive layer 216. The membrane 230 can be removed for joining the stabilised core layer to a covering layer simply by tearing it off the adhesive layer 216, for which purpose the tear-off fabric 228 is provided. For example, the adhesive layer 216 can also be activated by such a tearing-off action so that the surface produced after the membrane 230 is torn off can produce an adhesive joint with respect to a covering layer to be applied thereto.

For example, an additional adhesive layer may also be applied to the surface produced in this manner. The joint with respect to a covering layer which is to be applied can thereby be further optimised. The additional adhesive layer can be adapted to the joint to the adhesive layer surface on one side and, on the other side, can be adapted to the joint to the covering layer to be applied.

Figure 14:
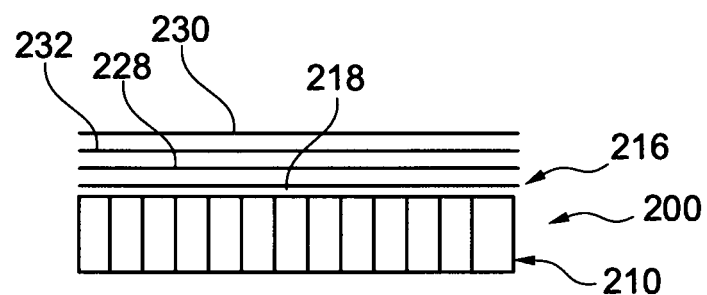

FIG. 14 shows another embodiment of a stabilised core layer 200. In this instance, the tear-off fabric 228 is also provided on the adhesive film layer 218 of the adhesive layer 216. Furthermore, the semi-permeable membrane 230 is also provided. However, another air-permeable separating film 232 is provided between the membrane 230 and the tear-off fabric 228.

The additional air-permeable separating film 232 allows the membrane 230 to be removed after the adhesive layer 216 has successfully been drawn off and hardened. Subsequently, there is provided an intermediate product in which the core layer 200 has a honeycomb core 210 having an adhesive layer 216, on which the tear-off fabric 228 is located. The membrane 230 is then already removed by means of the separating layer or separating film 232. The tear-off fabric 228 can then be used in order now to activate the adhesive layer 216, for example, for a laminating operation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for stabilising a honeycomb core for a sandwich-type structural component, comprising:
   a) configuring the honeycomb core;
   b) applying a hardenable adhesive layer to at least one exterior surface of the honeycomb core;
   b') applying a tear-off fabric to the adhesive layer;
   c) positioning a semi-permeable membrane on the at least one exterior surface on the tear-off fabric, the membrane being gas-permeable and liquid-impermeable;
   c') positioning a draw-off layer on the semi-permeable membrane;
   d) drawing off air in the honeycomb core through the semi-permeable membrane; and
   e) hardening the adhesive layer.

2. The method according to claim 1, further comprising arranging an air-permeable separating film between the membrane and the tear-off fabric.

3. The method according to claim 1, further comprising arranging an air-impermeable cover on the draw-off layer.

4. The method according to claim 1, wherein the adhesive layer is applied continuously and is perforated before the hardening in step e).

5. The method according to claim 1, further comprising perforating the adhesive layer before the application in step b).

6. The method according to claim 4, wherein the adhesive layer is perforated by a needle roller.

7. The method according to claim 4, wherein the air is drawn off through holes of the perforations before the adhesive layer is hardened, the adhesive layer initially becoming liquid during the hardening in step e) and the holes closing again when the adhesive layer hardens.

8. The method according to claim 1, wherein the adhesive layer has at least one adhesive film layer having a carrier structure, the carrier structure having a sealed structure which is not completely closed such that the adhesive layer is held together by surface tension effects of the adhesive film when the adhesive film liquefies during the hardening in step e) so as to minimise a tendency towards a formation of holes in the layer.

9. The method according to claim 1, wherein the adhesive layer has at least one adhesive film which is film-like at ambient temperature and is temporarily liquid only after being heated.

10. The method according to claim 1, wherein the following steps are provided after the hardening in step e):
   removing the tear-off fabric;
   arranging a covering layer on at least one side of the honeycomb core stabilised with the adhesive layer; and
   joining the covering layer to the honeycomb core in a laminating operation.

11. The method according to claim 10, wherein the laminating operation comprises hardening of a matrix material, the matrix material initially becoming liquid during hardening and the adhesive layer preventing the matrix material from becoming introduced into the honeycomb cores.

12. A device for stabilising a honeycomb core for a sandwich-type structural component, comprising:
   a receiving device for receiving a workpiece;
   a vacuum device for producing a negative pressure;

a honeycomb core having a hardenable adhesive layer applied on at least one side disposed as the workpiece in the receiving device;
a tear-off fabric disposed on the adhesive layer;
a semi-permeable membrane which is gas-permeable and liquid-impermeable disposed on the honeycomb core on the tear-off fabric; and
a draw-off layer disposed on the semi-permeable membrane,
wherein the vacuum device is configured to draw off air in the honeycomb core at least partially through the semi-permeable membrane.

13. A stabilized core layer for a sandwich-type structural component having:
a honeycomb core having a large number of honeycomb-like cells which are separated from each other by partition walls, the partition walls extending in a thickness direction of the honeycomb core;
at least one adhesive layer applied to front faces of the partition walls, the adhesive layer having at least one hardened adhesive film layer closing the honeycomb-like cells on at least one side in a manner that reduces introduction of resin in a subsequent laminating operation with a resin-impregnated covering layer, the adhesive layer having openings having a maximum diameter of 0.1 mm;
a tear-off fabric disposed on the adhesive layer;
a semi-permeable membrane which is gas-permeable and liquid-impermeable disposed on the tear-off fabric; and
a draw-off layer disposed on the semi-permeable membrane.

14. A method for stabilising a honeycomb core for a sandwich-type structural component, comprising:
a) configuring the honeycomb core;
b) applying a hardenable adhesive layer to at least one exterior surface of the honeycomb core;
b') applying a tear-off fabric to the adhesive layer;
c) positioning a semi-permeable membrane on the at least one exterior surface, the membrane being gas-permeable and liquid-impermeable and being positioned on the tear-off fabric;
d) drawing off air in the honeycomb core through the semi-permeable membrane; and
e) hardening the adhesive layer.

15. The method according to claim 14, further comprising arranging an air-permeable separating film between the membrane and the tear-off fabric.

16. The method according to claim 14, wherein the following steps are provided after the hardening in step e):
removing the tear-off fabric;
arranging a covering layer on at least one side of the honeycomb core stabilised with the adhesive layer; and
joining the covering layer to the honeycomb core in a laminating operation.

17. The method according to claim 16, wherein the laminating operation comprises hardening of a matrix material, the matrix material initially becoming liquid during hardening and the adhesive layer preventing the matrix material from becoming introduced into the honeycomb cores.

18. A method for stabilising a honeycomb core for a sandwich-type structural component, comprising:
a) configuring the honeycomb core;
b) applying a hardenable adhesive layer to at least one exterior surface of the honeycomb core;
c) positioning a semi-permeable membrane on the at least one exterior surface, the membrane being gas-permeable and liquid-impermeable;
d) drawing off air in the honeycomb core through the semi-permeable membrane; and
e) hardening the adhesive layer,
wherein the at least one layer of adhesive film is applied continuously and is perforated before the hardening in step e), and
wherein the air is drawn off through holes of the perforations before the adhesive layer is hardened, the adhesive layer initially becoming liquid during the hardening in step e) and the holes closing again when the adhesive layer hardens.

19. A method for stabilising a honeycomb core for a sandwich-type structural component, comprising:
a) configuring the honeycomb core;
b) applying a hardenable adhesive layer to at least one exterior surface of the honeycomb core;
c) positioning a semi-permeable membrane on the at least one exterior surface, the membrane being gas-permeable and liquid-impermeable;
d) drawing off air in the honeycomb core through the semi-permeable membrane; and
e) hardening the adhesive layer,
wherein the adhesive layer has at least one adhesive film layer having a carrier structure, the carrier structure having a sealed structure which is not completely closed such that the adhesive layer is held together by surface tension effects of the adhesive film when the adhesive film liquefies during the hardening in step e) so as to minimise a tendency towards a formation of holes in the layer.

* * * * *